United States Patent
Yoavaphankul

(10) Patent No.: US 9,845,815 B2
(45) Date of Patent: Dec. 19, 2017

(54) APPARATUS FOR CREATING A SWIRLING FLOW OF FLUID

(71) Applicant: Metha Yoavaphankul, Bangkok (TH)

(72) Inventor: Metha Yoavaphankul, Bangkok (TH)

(73) Assignee: Luxnara Yaovaphankul, Bangkok (TH)

( * ) Notice: Subject to any disclaimer, the term of this patent is extended or adjusted under 35 U.S.C. 154(b) by 259 days.

(21) Appl. No.: 14/409,194

(22) PCT Filed: Jul. 29, 2013

(86) PCT No.: PCT/TH2013/000031
§ 371 (c)(1),
(2) Date: Dec. 18, 2014

(87) PCT Pub. No.: WO2014/104988
PCT Pub. Date: Jul. 3, 2014

(65) Prior Publication Data
US 2015/0136261 A1    May 21, 2015

(30) Foreign Application Priority Data
Dec. 27, 2012   (TH) ................................ 1201006816

(51) Int. Cl.
*F15D 1/00* (2006.01)
*F02B 31/00* (2006.01)

(52) U.S. Cl.
CPC ............ *F15D 1/0015* (2013.01); *F02B 31/00* (2013.01); *Y10T 137/2109* (2015.04)

(58) Field of Classification Search
CPC .......... F15D 1/00; F15D 1/0015; F02B 31/00; F02B 2031/003; F02B 19/08; F02B 2023/108; F02M 35/10059
See application file for complete search history.

(56) References Cited

U.S. PATENT DOCUMENTS

| 2,052,869 | A | 9/1936 | Coanda |
| 2,796,147 | A | 6/1957 | Coanda |
| 7,267,098 | B1 * | 9/2007 | Tasanont ................. F02B 31/04 123/306 |
| 2003/0221662 | A1 | 12/2003 | Wijaya |
| 2005/0279862 | A1 * | 12/2005 | Mao ...................... F23D 11/107 239/403 |

(Continued)

FOREIGN PATENT DOCUMENTS

| FR | 943209 A | 3/1949 |
| WO | 2011009166 A1 | 1/2011 |

OTHER PUBLICATIONS

International Search Report dated Jul. 11, 2013 in International Application No. PCT/TH2013/000031.

*Primary Examiner* — Jacob Amick
(74) *Attorney, Agent, or Firm* — Kim Winston LLP

(57) ABSTRACT

An apparatus for creating a swirling flow of fluid comprises a transmission base (1) with an internal cavity (2) to receive the fluid flow from outside via a side hole (3) which will become a hole side edge (4) to control the flow through of the fluid into the transmission base in a laminar swirling flow in the internal cavity of the transmission base. A part of the hole side edge may have an elevated insert supporting shoulder (10) to support the overlay attachment of another transmission base to stack them higher.

20 Claims, 2 Drawing Sheets

(56) References Cited

U.S. PATENT DOCUMENTS

2008/0173363 A1    7/2008  Betting
2013/0039742 A1*   2/2013  Wilson ..................... F01D 1/36
                                                    415/68

* cited by examiner

APPARATUS FOR CREATING A SWIRLING FLOW OF FLUID

CROSS-REFERENCE TO RELATED APPLICATION

This application is a U.S. National Phase Application under 35 U.S.C. §371 of International Application No. PCT/TH2013/000031 filed Jul. 29, 2013 which claims priority to Thailand Application No. 1201006816 filed Dec. 27, 2012, the entire disclosures of which are hereby incorporated by reference in their entirety.

FIELD OF THE INVENTION

The present invention relates to an apparatus for creating swirling a flow of fluid.

BACKGROUND AND PRIOR ART

Reference is made to U.S. Pat. No. 2,052,869 which discloses a device for creating a deflecting stream of a fluid flow by injection of the fluid with a sufficient high velocity through an orifice into another fluid. The fluid flowing at the sufficient high velocity would induce adjacent fluid in and guide it to flow towards the side through which the flow has been made difficult, which is the flow control devices such as flap and curve. The principle of the present invention is well known as Coanda Effect, and Reference is made to application U.S. 2008/0173363 A1 which discloses a fundamental device for creating a swirling flow of fluid. The device is configured as a base for transmission with an inclined side hole in which the fluid would flow through from outside to inside. Said fluid would flow in an inclined direction in order to disperse inside the transmission base. The flow is in a swirling motion but does not form a laminar swirling flow.

SUMMARY OF THE INVENTION

An apparatus for creating the swirling flow of fluid comprises a transmission base with an internal cavity to receive the fluid flow from outside via side penetrable hole where a hole side edge wherein the beginning section of convex curve of the said hole side cage has to be the surface with a smallest angle of deviation to the emerging axis of the said penetrable hole, and the said hole side edge has to be the nearest surface to emerging axis of the side penetrable hole in comparison with another surface surrounding emerging axis of the side penetrable hole to deflect the flow of incoming fluid to the internal cavity of the transmission base to flow attaching to the convex curve resulting in Coanda Effect phenomena, said Coanda Effect will create a laminar flow of fluid along the same plane as an internal surface of the transmission base and speed up flow velocity resulting a laminar swirling flow in the internal cavity of the transmission base. And a part of the hole side rim has an elevated insert supporting shoulder to support the overlay attachment of another transmission base to stack them higher.

The objective of the present invention is to provide an apparatus for creating the swirling flow of fluid, in which the fluid flow through from outside to inside of the apparatus via side penetrable hole to flow attaching to the convex curve and induce the fluid from the internal cavity of the transmission base to flow attaching to the convex curve resulting in Coanda Effect phenomena, said Coanda Effect will create a laminar flow of fluid along the same plane as an internal surface of the transmission base and speed up flow velocity resulting a laminar swirling flow in the internal cavity of the transmission base.

DETAILED DESCRIPTION

Figure 1:
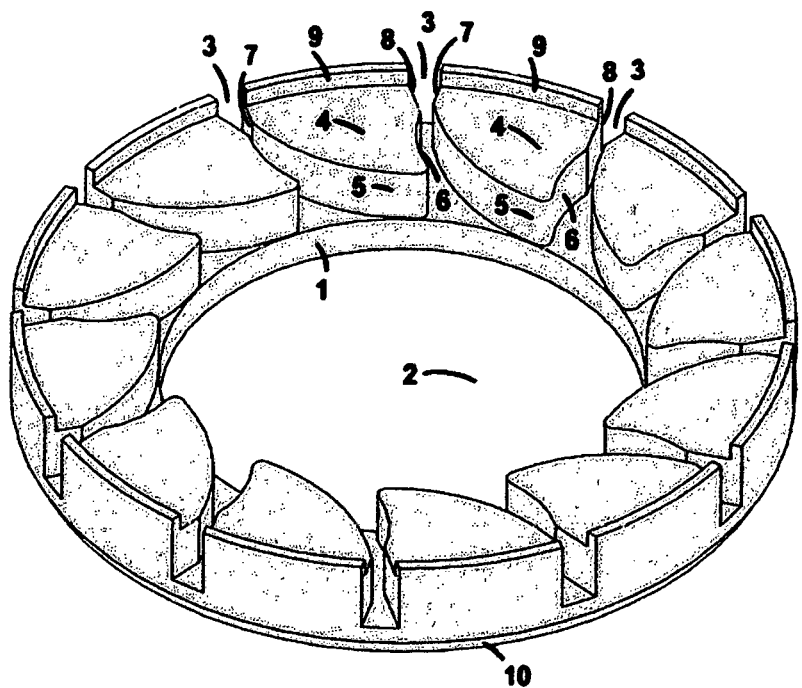
FIG. 1 shows an apparatus for creating a swirling flow of fluid of the present invention

As shown in FIG. 1, the apparatus for creating a swirling flow of fluid of the present invention comprises a transmission base 1 comprising a thick receiving base with an internal cavity 2 to receive the transmission of an inlet fluid to create the swirling flow before transferring said fluid with a swirling motion to an outlet channel, or said fluid with the swirling motion will flow out via the outlet of a configuration. Said configuration is equipped with the apparatus for creating the swirling flow of fluid in which a side of the transmission base 1 will have at least one side penetrable hole 3, which will become at least one hole side edge 4 to control the flow through of the fluid from outside of the transmission base 1 to inside of the transmission base 1 in a laminar flow along the same plane as the internal surface of the transmission base 1 (as clearly shown in FIG. 2) of which the hole side edge 4 comprises an elevated shoulder from the transmission base 1 at the side of the side penetrable hole 3 to control the flow through of the fluid transferred from outside of the apparatus for creating the swirling flow of fluid.

A part of the surface of the hole side edge 4 is a convex curve 5 for a distance to support the passing fluid that flows in the laminar flow along the same plane of an external surface of the convex curve 5.

Another part of the surface of the hole side edge 4 at the opposite side of the convex curve 5 can be a concave curve 6 for a distance to enable the fluid transfer via the side through a hole 3 for a better laminar flow along the same plane of the external surface of the convex curve 5.

A part of the convex curve 5 at the inlet of the side penetrable hole 3 can be a concave curve 7 that supports the convex curve 5 for a distance to assist the outside fluid for a better flow into the side penetrable hole 3 at the side of convex curve 5.

A part of the concave curve 6 at the inlet of the side penetrable hole 3 can be a concave curve 8 that supports the concave curve for a distance to assist the outside fluid for a better flow into the side penetrable hole 3 at the side of concave curve 6, in which said hole side edge 4, wherein the beginning section of convex curve 5 of said hole side edge 4 has to be the surface with a smallest angle of deviation to the emerging axis of the side penetrable hole 3, and the said hole side edge 4 has to be the nearest surface to an emerging axis of the side through the hole 3 in comparison with another surface surrounding the emerging axis of the side penetrable hole 3 to deflect the flow through of the fluid which flow into the internal cavity 2 of the transmission base 1 to flow attaching to the convex curve 5 and induce the fluid from the internal cavity 2 of the transmission base 1 to flow attaching to the convex curve 5 resulting in the Coanda Effect phenomena. The result of said Coanda Effect will create a laminar flow along the same plane as the internal surface of the transmission base 1 and speed up the flow velocity resulting in a laminar swirling flow in the internal cavity 2 of the transmission base 1.

Figure 3:
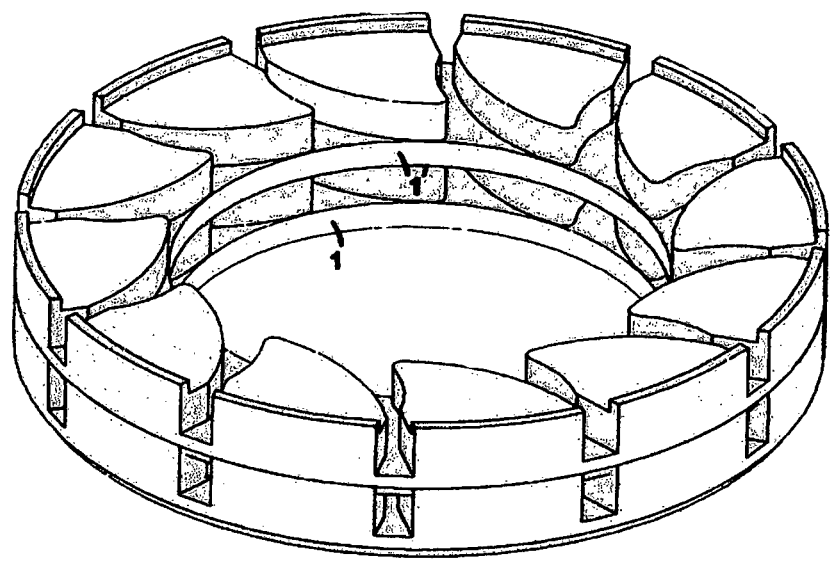
FIG. 3 shows an overlay attachment of an apparatus for creating a swirling flow of fluid of the present invention

A part of the hole side edge 4 in which at least one rim can have an elevated insert supporting shoulder 9 to support the overlay attachment of another transmission base to stack them higher (as shown in FIG. 3).

Figure 4:
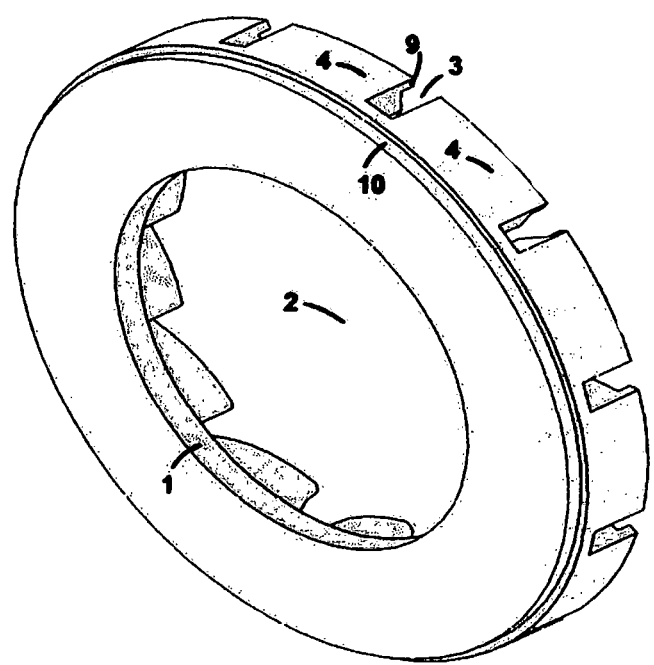
FIG. 4 shows an apparatus for creating a swirling flow of fluid in another aspect of the present invention

A part of the transmission base 1 can have an elevated insert shoulder 10 (as shown in FIG. 4) to a degree for stacking the attachment to an insert supporting shoulder of another transmission base to stack them higher (as shown in FIG. 3).

Figure 2:
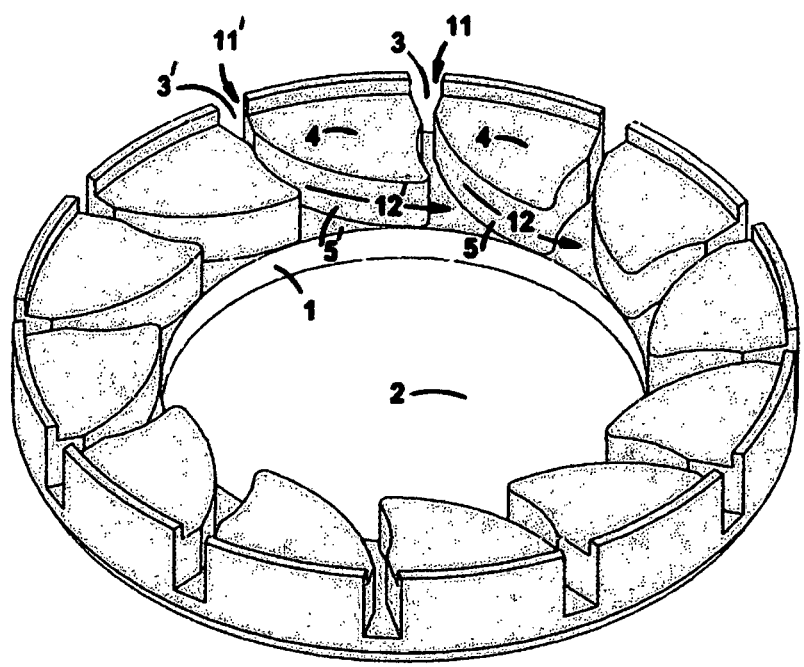
FIG. 2 shows a fluid flow of an apparatus for creating a swirling flow of fluid of the present invention

As shown in FIG. 2, the fluid flow of the apparatus for creating the swirling flow of fluid of the present invention comprises an outside fluid 11 which will be transferred via the side penetrable hole 3 into the internal cavity 2 of the transmission base 1 along the same plane of the surface of the convex curve 5 to become a surface plane fluid 12. At the same time, an outside fluid 11' that is transferred via another side penetrable hole 3' to flow into the internal cavity 2 of the transmission base 1 along the same plane of surface of the convex curve 5' becomes a surface plane fluid 12' that assists the transmission in order to enable the surface plane fluid 12 to flow along the plane of the internal surface of the internal cavity 2 in a laminar flow at all times.

FIG. 3 shows a stacking attachment of the apparatus to create the swirling flow of fluid of the present invention which comprises the transmission base 1 that supports the stacking attachment of at least one transmission base 1' to increase the height or increase work efficiency of the apparatus for creating the swirling flow of fluid.

FIG. 4 shows an apparatus for creating a swirling flow of fluid in another aspect of the present invention in which a side of a transmission base 1 will have at least one side penetrable hole 3 for which will become at least one hole side edge 4 and a part of a hole side edge 4 in which at least one rim can have an elevated insert supporting shoulder 9 and a part of the transmission base 1 can have an elevated insert shoulder 10 raised to a certain degree to assist the stacking attachment to each other of the apparatus for creating the swirling flow of fluid.

BEST MODE OF THE INVENTION

The same as the disclosure in the detailed description of the invention.

The invention claimed is:

1. An apparatus for creating a swirling flow of fluid characterized in that said apparatus comprises a transmission base (1) in form of a receiving base with a hollow cylindrical internal cavity (2) completely circumscribed by the transmission base to receive a fluid flow from outside via at least one penetrable hole (3) that becomes a hole side edge (4) at a side of the side penetrable hole (3) at least one edge, wherein the internal cavity is in fluid communication with the at least one penetrable hole, wherein a beginning section of a convex curve (5) of said hole side edge (4) is a surface with a smallest angle of deviation to an emerging axis of the side penetrable hole (3), and said hole side edge is a nearest surface to the emerging axis of the side penetrable hole (3) in comparison with another surface surrounding the emerging axis of the side penetrable hole (3) to deflect the flow of an incoming fluid to the internal cavity (2) of the transmission base (1) to flow attaching to the convex curve (5) and induce the fluid from the internal cavity (2) of the transmission base (1) to flow attaching to the convex curve (5) resulting in Coanda Effect phenomena, said Coanda Effect will create a laminar flow of the fluid along the same plane as an internal surface of the transmission base (1) and speed up flow velocity resulting a laminar swirling flow in the internal cavity (2) of the transmission base (1).

2. The apparatus for creating the swirling flow of fluid according to claim 1, wherein the hole side edge (4) is an elevated shoulder from the transmission base (1) at the side of the side penetrable hole (3) to control the flow through of fluid transferred from outside of the apparatus for creating the swirling flow of fluid.

3. The apparatus for creating the swirling flow of fluid in claim 1, wherein a surface of a part of the hole side edge (4) is the convex curve (5) for a distance to support the flow through of the fluid that flows in a laminar flow along the same plane of an external surface of the convex curve (5).

4. The apparatus for creating the swirling flow of fluid in claim 1, wherein a surface of a part of the hole side edge (4) at an opposite side of the convex curve (5) is a first concave curve (6) for a distance to enable the transmission of the fluid via the side penetrable hole (3) to flow for a better laminar flow along the same plane of the external surface of the convex curve (5).

5. The apparatus for creating the swirling flow of fluid in claim 1, wherein a part of the convex curve (5) at an inlet of the side penetrable hole (3) is a second concave curve (7) for a distance to assist the outside fluid for a better flow into the side penetrable hole (3) at the side of the convex curve (5).

6. The apparatus for creating the swirling flow of fluid in claim 1, wherein a part of a first concave curve (6) at the inlet of the side penetrable hole (3) is a third concave curve (8) that supports the first concave curve for a distance to assist the outside fluid for a better flow into the side penetrable hole (3) at the side of the first concave curve (6).

7. The apparatus for creating the swirl flow of fluid in claim 1, wherein a part of the hole side edge (4) has an elevated insert supporting shoulder (9) to a higher degree for supporting an overlay attachment with an insert shoulder (10) of another transmission base (1) to stack them higher.

8. The apparatus for creating the swirling flow of fluid in claim 1, wherein a part of the transmission base (1) has an elevated insert shoulder (10) raised to a degree for a stacking attachment to an insert supporting shoulder (9) of another transmission base (1) to stack them higher.

9. The apparatus for creating the swirling flow of fluid in claim 1, wherein a stacking attachment of the transmission base (1) is stackable with another transmission base (1') to increase the height or increase the work efficiency of the apparatus for creating the swirling flow of fluid.

10. The apparatus for creating the swirling flow of fluid in claim 1, wherein said apparatus for creating the swirling flow of fluid is inside an external configuration of a part that requires a swirling flow of fluid.

11. An apparatus for creating a swirling flow of fluid characterized in that said apparatus comprises a transmission base in form of a receiving base with an internal cavity to receive a fluid flow from outside via at least one penetrable hole that becomes a hole side edge at a side of the side penetrable hole at least one edge, wherein a beginning section of a convex curve of said hole side edge is a surface with a smallest angle of deviation to an emerging axis of the side penetrable hole, and said hole side edge is a nearest surface to the emerging axis of the side penetrable hole in comparison with another surface surrounding the emerging axis of the side penetrable hole to deflect the flow of an incoming fluid to the internal cavity of the transmission base to flow attaching to the convex curve and induce the fluid from the internal cavity of the transmission base to flow attaching to the convex curve resulting in Coanda Effect phenomena, said Coanda Effect will create a laminar flow of the fluid along the same plane as an internal surface of the transmission base and speed up flow velocity resulting a laminar swirling flow in the internal cavity of the transmission base, and wherein a part of the convex curve at an inlet of the side penetrable hole is a second concave curve for a distance to assist the outside fluid for a better flow into the side penetrable hole at the side of the convex curve.

12. The apparatus for creating the swirling flow of fluid in claim 11, wherein a surface of a part of the hole side edge at an opposite side of the convex curve is a first concave curve for a distance to enable the transmission of the fluid via the side penetrable hole to flow for a better laminar flow along the same plane of the external surface of the convex curve.

13. The apparatus for creating the swirling flow of fluid in claim 11, wherein a part of a first concave curve at the inlet of the side penetrable hole is a third concave curve that supports the first concave curve for a distance to assist the outside fluid for a better flow into the side penetrable hole at the side of the first concave curve.

14. The apparatus for creating the swirl flow of fluid in claim 11, wherein a part of the hole side edge has an elevated insert supporting shoulder to a higher degree for supporting an overlay attachment with an insert shoulder of another transmission base to stack them higher.

15. The apparatus for creating the swirling flow of fluid in claim 11, wherein a part of the transmission base has an elevated insert shoulder raised to a degree for a stacking attachment to an insert supporting shoulder of another transmission base to stack them higher.

16. An apparatus for creating a swirling flow of fluid characterized in that said apparatus comprises a transmission base in form of a receiving base with an internal cavity to receive a fluid flow from outside via at least one penetrable hole that becomes a hole side edge at a side of the side penetrable hole at least one edge, wherein a beginning section of a convex curve of said hole side edge is a surface with a smallest angle of deviation to an emerging axis of the side penetrable hole, and said hole side edge is a nearest surface to the emerging axis of the side penetrable hole in comparison with another surface surrounding the emerging axis of the side penetrable hole to deflect the flow of an incoming fluid to the internal cavity of the transmission base to flow attaching to the convex curve and induce the fluid from the internal cavity of the transmission base to flow attaching to the convex curve resulting in Coanda Effect phenomena, said Coanda Effect will create a laminar flow of the fluid along the same plane as an internal surface of the transmission base and speed up flow velocity resulting a laminar swirling flow in the internal cavity of the transmission base, and wherein a part of the hole side edge has an elevated insert supporting shoulder to a higher degree for supporting an overlay attachment with an insert shoulder of another transmission base to stack them higher.

17. The apparatus for creating the swirling flow of fluid in claim 16, wherein a surface of a part of the hole side edge at an opposite side of the convex curve is a first concave curve for a distance to enable the transmission of the fluid via the side penetrable hole to flow for a better laminar flow along the same plane of the external surface of the convex curve.

18. The apparatus for creating the swirling flow of fluid in claim 16, wherein a part of the convex curve at an inlet of the side penetrable hole is a second concave curve for a distance to assist the outside fluid for a better flow into the side penetrable hole at the side of the convex curve.

19. The apparatus for creating the swirling flow of fluid in claim 16, wherein a part of a first concave curve at the inlet of the side penetrable hole is a third concave curve that supports the first concave curve for a distance to assist the outside fluid for a better flow into the side penetrable hole at the side of the first concave curve.

20. The apparatus for creating the swirling flow of fluid in claim 16, wherein a part of the transmission base has an elevated insert shoulder raised to a degree for a stacking attachment to an insert supporting shoulder of another transmission base to stack them higher.

* * * * *